S. L. Geer.
Chemical App's.
N° 43,193.   Patented Jun. 21, 1864.

Witnesses
Harry Morris
C. L. Topliff

Inventor
Sidney L. Geer
per Munn & Co
attorneys.

UNITED STATES PATENT OFFICE.

SIDNEY L. GEER, OF NORWICH, CONNECTICUT.

IMPROVED FLASK OR RETORT.

Specification forming part of Letters Patent No. 43,193, dated June 21, 1864.

*To all whom it may concern:*

Be it known that I, SIDNEY L. GEER, of Norwich, in the county of New London and State of Connecticut, have invented a new and useful Improvement in Flasks and Retorts for Chemical Uses; and I do hereby declare that the following is a full, clear, and exact description thereof, which will enable others skilled in the art to make and use the same, reference being had to the accompanying drawings, making a part of this specification, in which—

Figure 1:
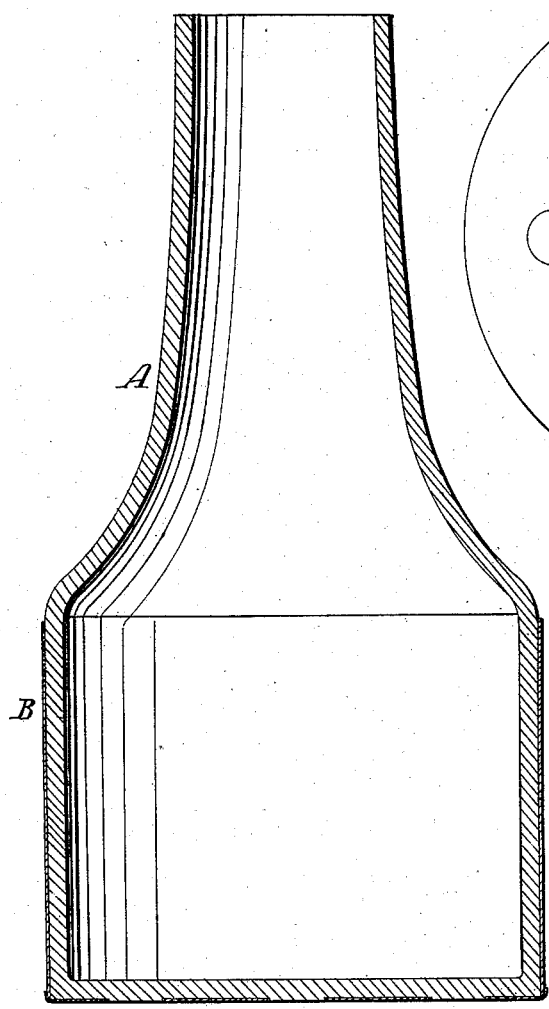
Figure 2:
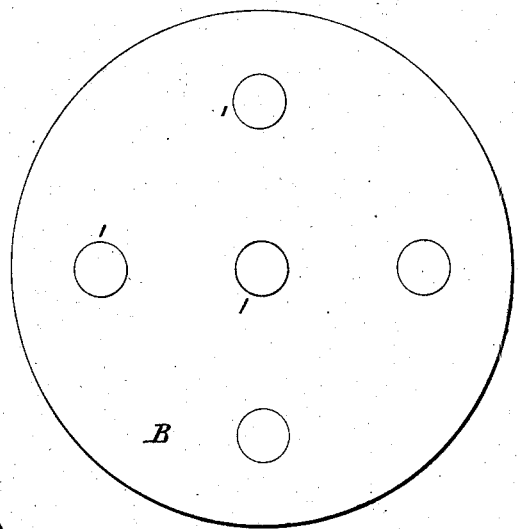

Figure 1 is a sectional elevation of my flask, and Fig. 2 is a plan view of its under side, seen from below.

Similar letters of reference indicate like parts.

My invention has for its object to introduce a new and improved retort for the use of chemists, dentists, and others in generating nitrous oxide gas from nitrate of ammonia, and which is also applicable to other similar uses. The retorts in common use for this purpose are simply flasks of glass, and much expense is incurred in using them by reason of their great liability to be broken.

I make my retort of clay, porcelain, or any mineral compound, with a glazed or vitrified interior surface and inclose it within a pocket of sheet-iron or other suitable metal.

A is the flask, made of any suitable form, inclosed below and up its sides to such a height as will protect its most exposed parts within the metal pocket B. The holes, which appear in the bottom of the pocket in Fig. 2 are punched through the metal, in order to permit the locking of the flasks to the pocket by filling the space flush with cementing material.

Having thus described my invention, I claim as new and desire to secure by Letters Patent—

The chemical flask or retort above described, made of clay or any mineral compound glazed within and incased by a metal pocket around its sides and bottom, as a new article of manufacture.

SIDNEY L. GEER.

Witnesses:
WESLEY W. BISHOP,
JOHN C. RIPLEY.